Sept. 4, 1934.  W. E. HULL  1,972,708
MAGNETIC COMPASS
Filed April 2, 1932

INVENTOR
Walter E. Hull

Patented Sept. 4, 1934

1,972,708

UNITED STATES PATENT OFFICE 1,972,708

MAGNETIC COMPASS

Walter E. Hull, Warren, Ohio

Application April 2, 1932, Serial No. 602,713

3 Claims. (Cl. 33—222)

My invention relates to magnetic compasses, and more particularly to the improvement of compasses for determining the direction of travel of automobiles, aircraft, etc.

The object of my invention is to provide a compass of neat appearance which is easy to read, economical to manufacture, and simple to install.

The drawing shows the instrument equipped with an elastic suction cup which adapts it to be attached to a smooth surface such as the windshield of an automobile.

Figure 1:
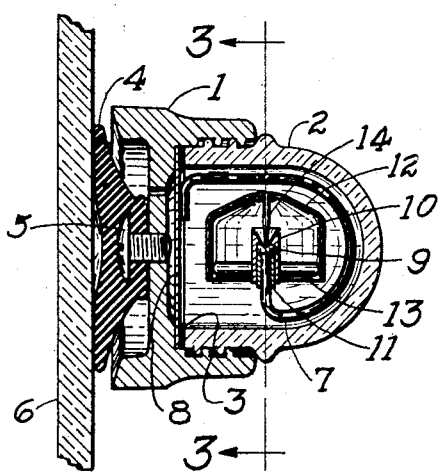
Figure 1 is a vertical section, taken on the line 1—1, Fig. 2.
Figure 2:
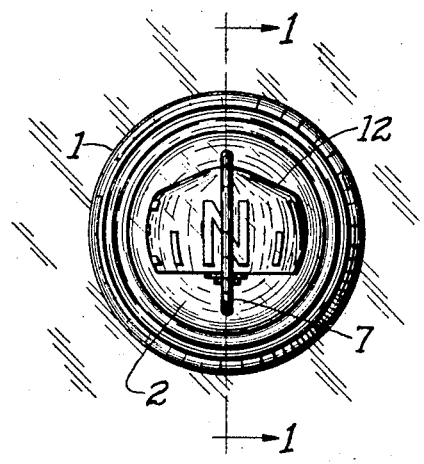
Figure 2 is a front view, showing the compass as it is viewed by an observer.
Figure 3:
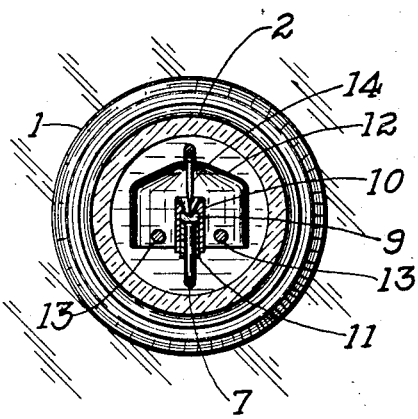
Figure 3 is a vertical section, taken on the line 3—3, Fig. 1.

As shown in the drawing, the casing comprises a threaded base section 1, which is of any suitable material such as aluminum or plastic composition, and a transparent dome-shaped part 2, which is threaded to fit the base section 1. The gasket 3 makes the casing tight, adapting it to be filled with a suitable liquid such as diluted alcohol. When the casing is filled with a liquid, the card appears magnified as shown in Figure 2. The liquid also has a damping effect which steadies the card.

A suction cup 4, of elastic material such as rubber, is secured to the base section 1 by means of the screw 5, which is moulded into the suction cup as shown. This provides a means for attaching the compass to a smooth surface as the windshield of an automobile.

By trying the compass in different locations on the windshield, a location may be selected where outside magnetic forces, such as metal parts on the automobile, will neutralize themselves and affect the compass reading very little if at all.

If it be desired to install the instrument on such a surface as the instrument board of an airplane, the suction cup can be replaced by an ordinary screw.

The bent wire 7 is of non-magnetic material and serves as a supporting means for the compass card as well as a lubber line. It could be secured directly to the base section 1, but it is preferable to insert a thin disc 8, which will deflect and take care of the small change in the volume of the liquid due to variations in temperature. The bent wire 7 may then be soldered or otherwise secured to the disc 8. The base section 1 is recessed to allow the disc 8 to deflect. The small hole through the base section is an air vent.

Any suitable pivot support may be mounted on the end of the bent wire 7. The support shown is a jewel 9, which has a cup shaped cavity. The jewel mounting consists of a flaring mouthed part 10 and a tubular part 11. Part 11 may be pressed into part 10 and the end of the wire 7 pressed into part 11.

A compass card which is adapted to be read from the side is pivotally supported by the jewel 9. The card shown consists of an inverted cup 12, which is of a suitable material such as sheet brass or celluloid. The steel magnets 13—13 and the hardened pivot 14 are soldered or otherwise secured to the card in the position shown.

The center of gravity of the card, which consists of the inverted cup 12, the magnets 13—13 and the pivot 14 is below the pivot point. This causes the card to balance in a level position, even though the casing may be tilted. The directional indications are located on the card in such positions that the indication appearing directly behind the lubber line corresponds to the direction the observer is facing, that is, if the compass be attached to the windshield of an automobile which is traveling due north, the "N" would be directly behind the lubber line as shown in Figure 2.

If the compass be inverted, the top of the cup 12 will come in contact with the bent wire 7 while the pivot 14 is still in the mouth of the jewel mounting 10. This prevents the card from getting out of place during shipment or from a jar. When the compass is righted, the pivot falls back into place in the jewel cavity. It is obvious that in assembling, the wire 7 must be formed or partially formed with the card in place.

Due to the cavity in the jewel being cup-shaped or round, the casing need not be mounted on an absolutely vertical surface, but may be mounted on a slanting surface such as a sloping windshield, in which case the pivot will balance on an off-center position in the jewel cavity.

While the drawing shows one practical embodiment of my invention, it is obvious that various changes in construction can be made without departing from the scope of the invention, therefore I do not wish to be limited to the exact form of construction shown in the drawing.

I claim:

1. A magnetic compass comprising in combination, a transparent dome-shaped section and end member comprising a casing adapted to be filled with a liquid, a thin disc interposed between said dome-shaped section and said end member, a side reading compass card, and means carried by said disc for pivotally supporting said compass card within said casing.

2. A magnetic compass comprising a side reading casing, a side reading compass card within said casing, a wire secured within said casing extending approximately horizontally over said compass card bending downwardly and back under said compass card and a pivotal support for said compass card secured to the end of said wire.

3. A magnetic compass comprising in combination, a transparent dome-shaped section and end member comprising a casing, a thin disc interposed between said dome-shaped section and said end member, a side reading compass card within said casing, a wire secured to said thin disc extending approximately horizontally over said compass card bending downwardly and back under said compass card and a pivotal support for said compass card secured to the end of said wire.

WALTER E. HULL.